United States Patent [19]
Leitz et al.

[11] 3,953,728
[45] Apr. 27, 1976

[54] APPARATUS FOR DETERMINING THE RELATIVE POSITION OF THE PLANE OF MAXIMUM AMPLITUDE OF THE LOCAL FREQUENCY COMPONENT

[75] Inventors: Ludwig Leitz; Werner Holle; Knut Heitmann, all of Wetzlar, Germany

[73] Assignee: Ernst Leitz G.m.b.H., Wetzlar, Germany

[22] Filed: Oct. 24, 1974

[21] Appl. No.: 517,846

[30] Foreign Application Priority Data
Nov. 14, 1973 Germany............................ 2356757

[52] U.S. Cl................................ 250/201; 250/204; 250/237 G; 354/25
[51] Int. Cl.² ........................................... G01J 1/20
[58] Field of Search ............. 356/4, 5, 28; 250/201, 250/204, 237 G; 354/25

[56] References Cited
UNITED STATES PATENTS

| | | | |
|---|---|---|---|
| 3,610,934 | 10/1971 | Turner | 250/204 |
| 3,682,071 | 8/1972 | Hosoe | 356/4 |
| 3,781,110 | 12/1973 | Leitz et al. | 250/201 |
| 3,798,660 | 3/1974 | Hasegawa et al. | 354/25 |
| 3,830,571 | 8/1974 | Imai et al. | 250/201 |

Primary Examiner—Alfred E. Smith
Assistant Examiner—D. C. Nelms
Attorney, Agent, or Firm—Gilbert L. Wells

[57] ABSTRACT

In an apparatus, an imaging system, at least one optically effective grating and a photoelectric receiver system are employed for determining the relative position of the plane of maximum amplitude of a spatial frequency component in the image of an object. The imaging system produces from light fluxes emanating from the object and traversing different regions of the entrance pupil of the imaging system an image of the object in a first, a second and a third intermediate image plane. The focussing screen mounted in the first plane is used for subjectively observing and focussing the object as well as for transmitting light fluxes to the optically effective grating which defines a given spatial frequency component and which is mounted at least in the vicinity of the second intermediate image plane for commonly modulating and splitting the light fluxes. The photoelectric receiver system generates therefrom electrical output signals used in devices for indicating and adjusting the sharp focussing of the object.

12 Claims, 7 Drawing Figures

APPARATUS FOR DETERMINING THE RELATIVE POSITION OF THE PLANE OF MAXIMUM AMPLITUDE OF THE LOCAL FREQUENCY COMPONENT

CROSS REFERENCES TO RELATED APPLICATIONS

Applicants claim priority under 35 U.S.C. 119 for Application 2356757, filed Nov. 14, 1973 in the Patent Office of the Federal Republic of Germany.

The disclosures of assignees copending applications Ser. Nos. 333,514, now U.S. Pat. No. 3,856,401 and 334,601, now U.S. Pat. No. 3,856,400, filed Feb. 20, 1973 and Feb. 22, 1973 respectively, in the U.S. Patent Office are incorporated herein. These applications show the state of the art of apparatus for determining the relative position of the plane of maximum amplitude and the gratings useful in the present invention.

BACKGROUND OF THE INVENTION

The present application relates to an apparatus for determining the relative position of the plane of maximum amplitude of the spatial frequency in the optical image of an object, at least one grating being placed as a correlator and a spatial frequency filter after the entry objective, this grating located in the vicinity of an image plane of the objective and being further provided with a receiver system located behind the grating in the direction of the light flux. The output signals from the receiver system are used for controlling a display and-/or adjusting instrument.

The state of the art of optical range finding systems incorporating an apparatus for determining the relative position of the plane of maximum amplitude of the spatial frequency in the optical image of an object may be ascertained by reference to U.S. Pat. No. 3,781,110 of Leitz, Heitmann and Schneider which issued Dec. 25, 1973. The disclosure of U.S. Pat. No. 3,781,110 is incorporated herein to further show the fundamentals relating to the use of push-pull signals as in the present invention.

Suggestions have been made in the prior art regarding such an apparatus to the effect that the prismatic adjusting or focusing screen of the viewing equipment be used as the spatial frequency filter in a single lens reflex camera.

SUMMARY OF THE INVENTION

The present invention is an advantageous variation of such equipment, being characterized in that a focusing or adjusting screen for subjective eye observation is mounted in a first intermediate image plane and in that an optically effective screen or grating is located in a second intermediate image plane, being endowed with ray splitting properties and acting as a spatial frequency filter, this grating modulates light fluxes passing through various pupil areas of the entry objective and transmits these fluxes in defined directions separately to the photoelectric receiver system. The output signals produced by the photoelectric receiver system may be antiphased — by utilization of physical or geometric optical beam splitting, for the chosen spatial frequency component. Optical means folding the path of rays, for instance in the form of a pentaprism, may be provided between the focusing screen and the grating. Advantageously the grating is movably supported and means are provided for moving this grating in oscillatory or continuous manner along at least one direction, preferably in its own plane. The screen or grating may be a screen or grating with a plurality of prisms on its surface and is so oriented that its grooves are preferably parallel to the side faces of the pentaprism which are parallel to each other. The focusing screen in a particular embodiment is provided with an axially symmetric, transparent, inside surface with or without a structure and furthermore with an outer surface with light refracting structure for subjective observation and/or focusing. Also, the pentaprism in a particular embodiment is provided with an exit surface for observing the object, which is associated with a fully reflecting mirror used only outside the pupil serving for observation, this fully reflecting mirror acting as a splitter layer. Appropriately, the bundles of rays intertwined by the correlator grating or screen by means of a condenser project at least two separate pupil images of the entry pupil, the parts of the latter pupil being associated with separate photoelectric detectors preferably so shaped as to fit the prismatic exit surface. Splitting of the exit pupil double images is caused by the inside surface of the focusing screen and is so dimensioned by suitable design of the structure elements that the zone of pupil overlap covers the prismatic exit surface.

Light fluxes passing through various pupil areas of the reproducing optics also may be transmitted as separate parts corresponding to these pupil areas to the photoelectric receiver system.

In order to control the display and/or adjustment instrumentation properly with respect to sign, one provides equipment for determining the magnitude and/or the phase and/or the frequencies of the photoelectric signals.

Frequency and/or phase of the photoelectric signals are used to determine the angular velocity of the object. Appropriately, photoelectric push-pull signals obtained from two areas of different pupil images are fed as input signals to at least one differential amplifier. A phase-sensitive rectifier is provided, which processes the output signals of the differential amplifier with the drive signal for the grating so as to obtain a reference signal. The apparatus of the present invention is advantageously used in a single lens reflex camera.

With respect to the prior art apparatus, the present invention holds the advantage of a larger share of light flux being available for photoelectric measurement. Furthermore, splitting of the light fluxes may be selected in arbitrary manner because this splitting is performed only after the first observation pupil. Hence this splitting is performed so that pupil overlap is eliminated with certainty in all cases. This applies especially when objectives are used with different maximum apertures. Lastly, the dimensions of the grating may be less than those of the focusing screen, whereby advantages are obtained relating to the mechanical design of the apparatus and to lesser drive power in the case of oscillatory motion of the screen.

BRIEF DESCRIPTION OF THE DRAWINGS

The present invention is best described by reference to the attached drawings showing particular embodiments of the invention in diagrammatic form, wherein.

DESCRIPTION OF THE PREFERRED EMBODIMENTS

Figure 1:
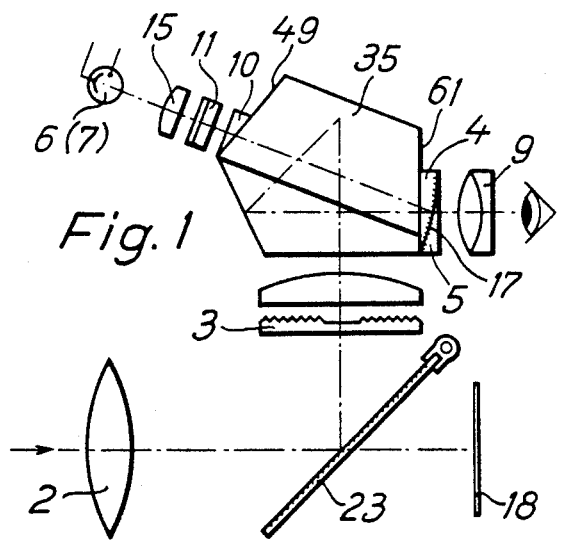
FIG. 1 shows in side view the path of the rays in an apparatus of the invention with a pentaprism.
Figure 1A:
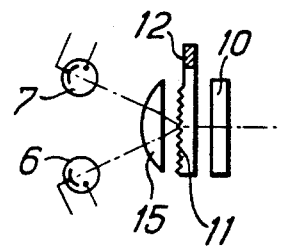
FIG. 1a is a top view of a detail of FIG. 1.

FIG. 1 shows the application of an apparatus of the present invention to a single lens reflex camera. An entry objective 2 focuses an object (not shown) for measurement in a first plane via a pivotable mirror 23, a focusing or adjusting screen 3 being located in this first image plane. Screen 3 is shown in greater detail in FIG. 2. The path of the image-forming rays passes through screen 3 and is bent by a pentaprism 35. As shown, the image-forming light bundle upon twofold reflection reaches exit surface 61 of prism 35, which is followed by a mirror 17. The latter is cemented between two glass parts 4 and 5. FIG. 3 shows a top view of mirror 17. This mirror is provided with a central area 17b which is not reflecting at all or only partly and serves for observation through a subsequent finding ocular 9. Area 17b is surrounded by a fully reflecting area 17a. Upon reflection at the fully mirrored part, the rays pass through a prism 10 cemented on prism surface 49 and arrive on a grating plate 11 having a plurality of prisms on its surface, located in the intermediate focusing plane of prism 10, the grating grooves of this plate lying parallel to the plane of the drawing. This plate 11 is so supported that it may move normal to the plane of the drawing and may be made to oscillate by means of a piezoelectric resonator 12. A subsequent condensing lens 15 concentrates the rays split at grating 11 on two photoelectric detectors 6 and 7 so that if there is relative motion by one prism graduation normal to the plane of the drawing between plate 11 and the object's image projected onto it, the rays belonging to a particular object point will switch from one photoelectric detector to the other and vice versa. FIG. 1a shows the design components 6, 7, 10, 11, 12 and 15 in a section perpendicular to the plane of FIG. 1.

Figure 5:
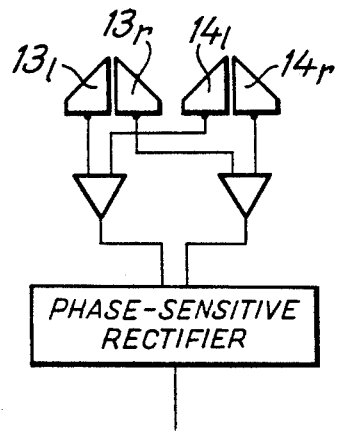
FIG. 5 shows an exit pupil-double image generated by the correlation-measurement grating of FIG. 1, and a circuit diagram for the related photoelectric signals.
Figure 6:
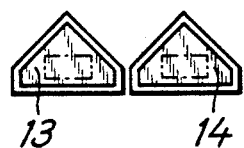
FIG. 6 shows photoelectric detectors, in this instance two, form-fitted to the exit surface of the pentaprism of FIG. 3.

As shown in the drawings, each photoelectric detector receives the sum of the light fluxes from a complete pupil surface. In a variation of the present invention, however, each detector 6 and 7 is replaced by a pair of areal photoelectric receivers $13_l$, $13_r$, and $14_l$, $14_r$ respectively, as shown in FIGS. 5 and 6, for the purpose of separately receiving the right and left pupil halves, these receivers being form-fitted to the pupils of the prismatic exit surface 17. Film 18 for taking the object's image in the single lens reflex camera is located behind pivoting mirror 23 in the path of the entry rays through objective 2.

Fundamentals relating to the use of push-pull signals are described in U.S. Pat. No. 3,781,110.

Figure 2:
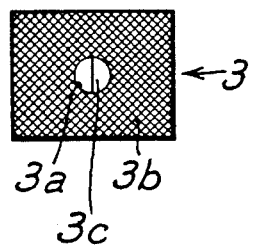
FIG. 2 is a top view of the adjusting or focusing screen.
Figure 3:
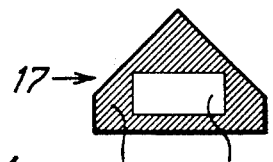
FIG. 3 is a top view of an exit surface of the pentaprism of FIG. 1.
Figure 4:
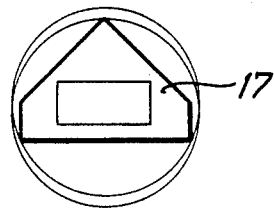
FIG. 4 shows the shift in height of a pupil image by a measurement wedge.

As shown in FIG. 2, focusing screen 3 is provided with an outer grating area 3b for the purpose of coarse, subjective visual adjustment via ocular 9. On the other hand, an inside area 3a corresponds to the measuring field of grating 11 and is provided with a measurement wedge 3c as an accessory for subjective purposes, the separation edge of this wedge being capable of splitting the image in the direction of the grooves of grating 11 by means of its orientation, as shown in FIG. 4. Such a focusing screen 3 is disclosed in U.S. Pat. No. 3,781,110.

An object is adjusted or focused on focusing screen 3 and further on grating 11 by means of objective 2 which can be adjusted along the optical axis. In the case of focusing, the eye at ocular 9 sees a sharp image of the desired object on the grating structure 3b of screen 3 (FIG. 2), lacking furthermore any kind of splitting at the central part of area 3a. In such a case there is also a sharp object image on grating 11, so that for relative motion between the object structure and the grating structure, the alternating light fluxes at the photoelectric detectors 6 and 7 generate signals of maximum amplitudes. These signals are filtered in known manner of their in-phase components by taking the difference and are analyzed for magnitudes. Objective 2 is controlled for optimum focusing by a control circuit.

If photoelectric receivers $13_l$, $13_r$ and $14_l$, $14_r$ associated with two diametral parts of entry objective 2 are used twice, as per FIG. 5, then upon focusing, the alternating current output signals between $13_r$ and $14_r$ and between $13_l$ and $14_l$ are push-pull, while they are in-phase between $13_l$ and $13_r$ and between $14_l$ and $14_r$, when there is relative motion between grating 11 and the object image. Accordingly, the signals from receivers $13_l$ and $14_l$ and from $13_r$ and $14_r$ are always connected to push-pull amplifiers. If now the image plane were to lie in front of or behind grating 11, then according to the parallaxes of the right and left objective parts $(r, l)$, the phases of the amplifier output signal belonging to part $(r)$ are time-shifted in one sense and those phases of the signal belonging to part $(l)$ are time-shifted in the other, or vice versa.

Therefor, magnitude and sign of the deviation from focus in the single lens reflex camera is obtained from those phase shifts in addition to analysis of signal amplitude.

Another embodiment of the present invention is suited not only for focusing purposes of photographic objectives, but it also allows for obtaining vehicle speed control or monitoring by means of the frequency of the measurement signals. Visual observation may be used to obtain proper setting as to the path or track and to detect the vehicle by means of the apparatus. In connection with the camera used per the present invention, photographic recording of monitored vehicles is feasible for instance by providing an automatic camera release being actuated by the electrical signals generated by the apparatus of the present invention when the maximum permissible speed is exceeded or when the minimum safe distance is no longer being kept.

The pupil splitting by the measurement wedge in field 3a of the focusing screen 3 described in FIG. 2 is not critical with respect to electrical signal analysis because it is parallel to the grooves of grating 11 and without influence on the signal phases. However, scaling of the splitting should be such by means of a properly selected angle of the measurement wedge that the zone of pupil overlap still covers the exit surface 17 of pentaprism 35.

The determination of the angular speed or velocity of an object is to be performed by using the frequency and/or the phase of the photoelectrical signals generated by the photoelectrical receiver system 6, 7.

If there are used two areas of different pupil images for measuring, the obtained push-pull signals are to be fed to at least one differential amplifier 19, 20.

Providing an oscillating movement of the grating 11 by means of piezoelectric resonator 12 a phase-sensitive rectifier 21 not shown in the drawing, but known per se is used in processing the differential amplifier output signals and the drive signals for the grating 11 into reference signals.

Preferably, the apparatus of the invention may be mounted for instance in a single lens reflex camera or in a camera for monitoring and recording the velocity as well as the safety spacing of a vehicle.

When using the apparatus of the present invention in a photographic camera, it is advantageous to derive informations regarding measurement of a limited object portion from the output signals of the photoelectric receiver system. For an undirectional, integrating light measurement, on the other hand, a photoelectric detector covering the outer field of the measured object detail on prismatic grating 11 is suitable.

Even though gratings having a plurality of prisms on their surfaces have been used as illustrative embodiments, other gratings, for instance amplitude gratings, as disclosed in U.K. Patent No. 419,307 may also be used for implementing the present invention.

Geometric or physical optical beam splitting means for producing output signals from the photoelectric receiver system 180° out of phase for the selected spatial frequency comprise for instance the grating 11 or an optical component as disclosed in U.S. application Ser. No. 480,822.

We claim:
1. In an apparatus, an imaging system, at least one optically effective grating and a photoelectric receiver system being employed for determining the relative position of the plane of maximum amplitude of a spatial frequency component in the image of an object, said imaging system having an entrace pupil, said entrance pupil having regions which are traversed by light fluxes emanating from said object, and forming an image of said object in a plurality of intermediate image planes, said grating displaying a given spatial frequency component and being mounted in at least the vicinity of one of said intermediate image planes for receiving said image and for modulating said light fluxes, said photoelectric receiver system consisting of at least two photoelectric detectors responsive to light fluxes passing said grating and generating therefrom electrical push-pull signals used in governing controlling means, the improvement comprising:
   mounted in a first one of said intermediate image planes a focussing screen (3) divided into at least two areas (3*a*;3*b*); one of said areas chosen for subjectively observing and focussing said object, the other having a given size and being applied to transmit for further processing light fluxes selected from one of said regions of said entrance pupil;
   located in a second one of said intermediate image planes said grating (11) jointly modulating said light fluxes traversing said selected region and having properties for splitting said light fluxes thus causing the production of at least two components being separately transferred in defined directions to said photoelectric receiver system (6,7), and
   optical means (35) arranged between said focussing screen and said grating for folding the beam path.

2. The apparatus of claim 1, wherein said push-pull output signals for said spatial frequency component result from means for geometrical optical beam splitting means.

3. The apparatus of claim 1, wherein said push-pull output signals for said spatial frequency component result from means for physical optical beam splitting means.

4. The apparatus of claim 1, wherein said grating (11) is movably supported and a drive (12) is provided for oscillating said grating in its plane, a reference signal being derived from said oscillation.

5. The apparatus of claim 1, wherein said focussing screen (3) has an axially symmetric inner transparent area (3*a*) and an external arean (3*b*), the latter being provided with light refractory structures for subjectively observing and focussing said object.

6. The apparatus of claim 5, wherein said inner area (3*a*) of said focussing screen is provided with structure elements (3*c*) oriented in parallel to the grooves of said prismatic grating, said structure elements generating from said images of said images of said entrance pupil formed by said imaging system split images partly overlapping, the zone of overlap covers the prism exit surface (61).

7. The apparatus of claim 1 having means for separately splitting said light fluxes traversing said selected regions of said entrance pupil of said imaging system and being separately fed to said photoelectric receiver system according to said regions of said entrance pupil.

8. The apparatus of claim 7, wherein said electrical push-pull signals obtained from two regions of said images of said entrance pupil are fed to at least one differential amplifier (19,20).

9. The apparatus of claim 1, wherein said optical means for folding the ray path is a pentaprism (35).

10. The apparatus of claim 9, wherein said grating has a plurality of prisms on its surface with the grooves between prisms lying parallel to mutually parallel side faces of said pentaprism.

11. The apparatus of claim 9, wherein said pentaprism (35) is provided with an exit surface (61) representing said third intermediate image plane and masking the image of said entrance pupil, by way of which said object is observed, a fully reflecting mirror (17) being associated with said surface as a dividing layer outside said region of said pupil used for observation.

12. The apparatus of claim 11, wherein said prismatic grating (11) is producing from said light fluxes bundles of beams which project at least two separate, non-overlapping images of said entrance pupil by means of condensing lens (15), separate photoelectric detectors (13*i*; 13*r*; 14*i*; 14*r*) matched in shape to said exit surface (61) of said pentaprism being associated with said selected pupil region of said entrance pupil.

* * * * *